(12) United States Patent
Sasada

(10) Patent No.: US 6,714,680 B1
(45) Date of Patent: Mar. 30, 2004

(54) METHOD AND APPARATUS FOR IMAGE POSITIONING PROCESSING

(75) Inventor: Ryoji Sasada, Kaisei-machi (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 613 days.

(21) Appl. No.: 09/585,471

(22) Filed: Jun. 2, 2000

(30) Foreign Application Priority Data

Jun. 2, 1999 (JP) ............................................. 11-155257
Nov. 9, 1999 (JP) ............................................. 11-317988

(51) Int. Cl.$^7$ .............................. G06K 9/62; G06K 9/36
(52) U.S. Cl. ...................... 382/216; 382/291; 382/284
(58) Field of Search .................................. 382/132, 284, 382/130, 131, 209, 291, 216, 151; 250/581, 582, 584, 363.01, 363.02

(56) References Cited

U.S. PATENT DOCUMENTS

| | | | |
|---|---|---|---|
| 4,258,264 A | | 3/1981 | Kotera et al. ................ 250/484 |
| 4,346,295 A | | 8/1982 | Tanaka et al. ............ 250/327.2 |
| 4,356,398 A | | 10/1982 | Komaki et al. .......... 250/327.2 |
| 4,485,302 A | | 11/1984 | Tanaka et al. ............ 250/327.2 |
| 4,855,598 A | | 8/1989 | Ohgoda et al. .......... 250/327.2 |
| 5,982,945 A | * | 11/1999 | Neff et al. .................... 382/271 |
| 5,986,279 A | * | 11/1999 | Dewaele ...................... 250/582 |
| 6,243,103 B1 | * | 6/2001 | Takiguchi et al. ........... 345/634 |
| 6,269,177 B1 | * | 7/2001 | Dewaele et al. ............. 382/131 |
| 6,393,162 B1 | * | 5/2002 | Higurashi .................... 382/284 |
| 2001/0055429 A1 | * | 12/2001 | Hirosawa et al. ............ 382/284 |

FOREIGN PATENT DOCUMENTS

JP 56-11395 2/1981 ............ G21K/4/00

OTHER PUBLICATIONS

Patent Abstract of Japan 56011395 A Feb. 4, 1981.

* cited by examiner

*Primary Examiner*—Daniel Mariam
*Assistant Examiner*—Shefali Patel
(74) *Attorney, Agent, or Firm*—Sughrue Mion, PLLC

(57) ABSTRACT

Radiation images recorded serially on a plurality of sheets overlapping partially are positioned accurately. An image positioning processing apparatus comprises overlap area detection means for detecting an overlap area between two radiation images overlapping partially, rotation correction means for rotating, based on the overlap area, a lower image out of the two images, template setting means for setting a plurality of templates within the overlap area of the lower image, rank setting means for setting a reliability rank for each of the templates, matching position determining means for determining, based on the ranks of the templates, a matching position at which an image portion within each of the templates almost matches up with an image portion within the overlap area of an upper image, and positioning means for carrying out positioning of the two images based on the matching position having been determined.

18 Claims, 13 Drawing Sheets

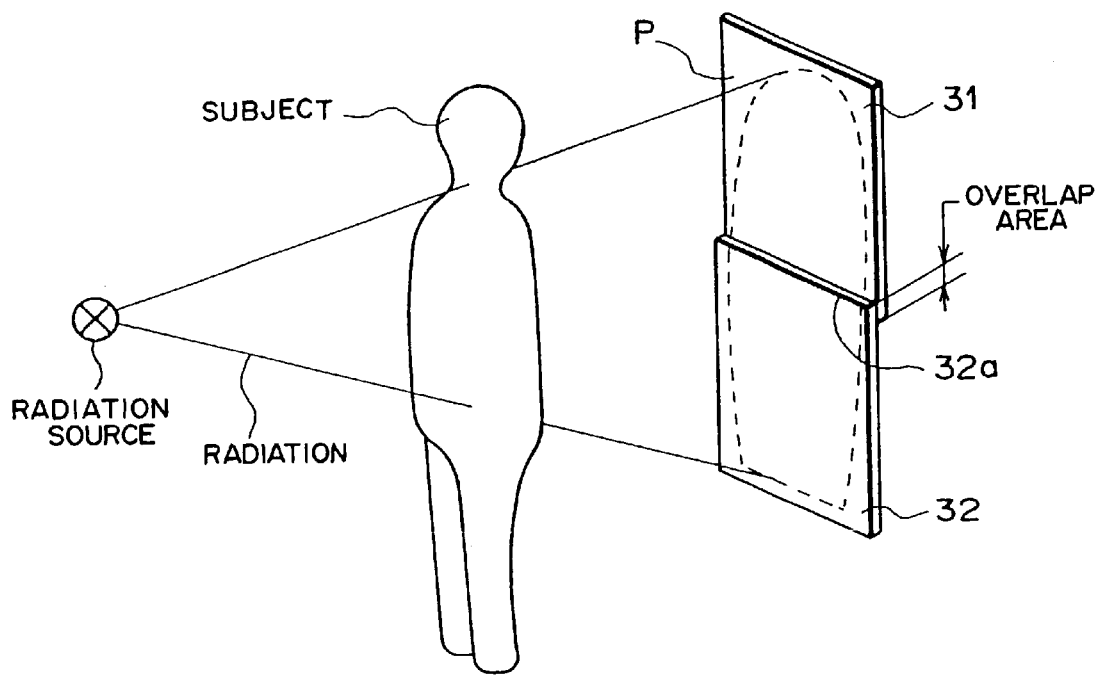
F I G. 2

METHOD AND APPARATUS FOR IMAGE POSITIONING PROCESSING

BACKGROUND OF THE INVENTION

1. Field of the Invention

The present invention relates to a method and an apparatus for image positioning. More specifically, the present invention relates to an improvement of a method and an apparatus for positioning two images by using a template.

2. Description of the Related Art

Computed Radiography (CR) systems have been in wide use recently for obtaining radiation images over an extremely wide radiation exposure range. In a CR system, radiation image information of a subject such as a human body is recorded on a stimulable phosphor sheet which stores a portion of energy of radiation (such as X rays, α rays, β rays, γ rays, electron rays, and ultraviolet rays) irradiated thereon and emits light in accordance with the stored energy upon exposure to stimulating rays such as visible light. The stimulable phosphor sheet storing the radiation image information is scanned with stimulating rays such as a laser beam to cause the sheet to emit the light which represents a signal in accordance with the image information. The light emitted is read by photoelectric reading means such as a photo-multiplier and the image signal is obtained. Based on the image signal, a radiation image of the subject is then output as a visible image on a recoding medium such as a photosensitive material or on a display apparatus such as a CRT (Japanese Unexamined Patent Publications Nos. 55(1980)-12429, 56(1981)-11395 and 56(1981)-11397, for example).

The stimulable phosphor sheets used in CR systems have various sizes depending on photographing targets, such as ½ cut, large, ¼ cut, and ⅙ cut. In orthopedics, demands for photographing a long image have been high, such as for an image from neck to waist in order to measure curvature of a spine, for example. Therefore, usage of stimulable phosphor sheets having a more elongated shape than the conventional sizes has been discussed.

However, in order to deal with such elongated sheets, radiation image reading apparatuses for reading image information from the stimulable phosphor sheets need to be redesigned substantially on sheet conveyers thereof, for example. Furthermore, such radiation image reading apparatuses are disadvantageous in terms of cost, since they are dedicated to elongated sheets.

In order to solve this problem, two conventional size sheets are used serially to create an elongated shape and a radiation image is recorded on this elongated sheet. Upon reading, the two sheets are read separately. In this manner, the image can be read by a conventional radiation image reading apparatus, and the above problem does not occur.

This method enables photographing of a more elongated-shape subject by using three or more sheets. Moreover, a subject of a wide, long shape can also be recorded by using the sheets serially in two orthogonal directions. Therefore, this method has excellent flexibility depending on subjects.

In such a case where photographing is carried out by using two or more sheets, edges of two neighboring sheets are pieced together or partially overlapped. In the former method, a portion of an image is necessarily lacking at the boundary of the two neighboring sheets. On the other hand, in the latter method, such lack of image does not occur.

However, in the latter method using two sheets overlapping partially, a proper radiation image of a subject is not reconstructed even if two radiation images independently read from the two sheets are pieced together, since the two sheets have respective images of the overlapped portion.

This problem occurs not only when radiation images read from stimulable phosphor sheets are positioned but also when general images need to be positioned.

Image positioning is necessary not only in the case where images are partially overlapped as in the above case of an image formed by two or more images combined, but also in the case where subtraction processing (such as energy subtraction processing or time subtraction processing for radiation images disclosed in Japanese Unexamined Patent Publication No. 59(1984)-83486, for example) or weighted addition processing (such as superposing processing for radiation images disclosed in Japanese Unexamined Patent Publication No. 56(1981)-11399, for example) on pixels at corresponding positions of two or more images overlapping almost completely is carried out. In such cases, the above problem also occurs.

The present invention has been conceived based on the problems described above, and an object of the present invention is to provide a method and an apparatus for accurately positioning two images at least partially overlapping.

SUMMARY OF THE INVENTION

In an image positioning processing method and an image positioning processing apparatus of the present invention, a plurality of templates are set for a portion where two images overlap and ranked according to their reliability. The two images are positioned based on the templates having been ranked.

In other words, the image positioning processing method of the present invention is a method of positioning two or more images overlapping at least partially to reconstruct an image, and the method comprises the steps of:

setting, on one of two images to be positioned, at least two positioning templates in an overlap area where the one image and the other image overlap at least partially;

setting a reliability rank for each of the templates representing adequacy as a template;

determining, based on the reliability rank, a matching position where an image portion of the one image in each of the templates almost matches up with an image portion of the other image in the overlap area; and positioning the two images based on the matching position having been determined.

"Overlapping at least partially" means not only the case where two images overlap partially but also the case where two images overlap almost completely.

"To reconstruct an image" refers to combining processing on two images overlapping partially and refers to subtraction or addition processing for two images overlapping almost completely.

The "reliability rank representing adequacy as a template" represents, according to a plurality of levels, adequacy as a template to be used in so-called template matching. The rank corresponds to whether or not a characteristic image portion exists within each of the templates. In other words, in the case where the image within the template is an image of uniform density distribution (such as completely black background) for example, the template generally has low adequacy as a template. In this case, the template has a low reliability rank. This is because the matching position at which a degree of matching is high cannot be specified by template matching when the image portion having uniform density distribution exists in the image to be matched by the template matching. However, for example, in a special case where an image portion of uniform density distribution exists only in an area of the same shape as the template in the other image as a target of template matching, the matching position can be specified. Therefore, the template is generally adequate and thus has a high reliability rank.

Meanwhile, templates having a characteristic portion such as an edge portion where density changes drastically have high adequacy and the rank thereof is high.

Therefore, the rank can be set simply and individually for each of the templates, based on a variance of the image portion in each of the templates, for example. In other words, a template having a characteristic portion such as an edge portion has a large variance and the reliability rank thereof is high. Meanwhile, a template not having a characteristic portion and having only a uniform density portion has a low variance. Therefore, the reliability rank thereof is set low. A template having at least one saturated pixel (a pixel whose value is a maximum, 255 in the case of 8-bit digital data) within pixels comprising the image portion in the template is preferably set to have a low reliability rank.

The rank may be set based on a result of template matching rather than on each of the templates. In other words, in template matching, while a template is being moved within the image to be matched up with, a correlation value (a degree of matching) representing similarity is found at each position therein. Therefore, the rank may be set based on whether or not a maximum of the matching degree at a specific position within a search range (an area of template movement) exceeds a predetermined threshold value. Alternatively, the rank may be set based on whether or not the position at which the matching degree becomes maximum exists only at a specific position (based on how the matching degree maximum peaks).

"Determining a matching position based on the reliability rank" means to determine the matching position according to a template having a high reliability rank. This is because a matching position found by using a template having a high reliability rank is a position of high reliability, while a matching position found by using a template having a low reliability rank is a position of low reliability. For example, a template having high reliability rank is selected in advance and the matching position is determined by using only the template having been selected. Alternatively, template matching may be carried out by using all templates so that a matching position is then determined by weighting a template matching result obtained by the template having high reliability rank. Furthermore, template matching may be carried out by using all templates so that the template having high reliability rank is selected based on the template matching result. The matching position can then be determined based on the template matching result found by using the high reliability template.

In other words, in the method using the pre-selected template of high reliability rank, one or more templates having high reliability ranks are selected from the two or more templates and the matching position is determined based on the template or the templates having been selected. More specifically, for example, the matching position may be determined according to the steps of:

presetting a search range of each of the templates having been selected, within the overlap area in the other image;

finding a degree of matching at each position within the search range having been preset while independently moving, within the search range, the template corresponding to the range;

selecting, for each of the templates, a position at which the degree of matching is highest; and determining, as the matching position, a position frequently selected out of the positions selected for each of the templates.

In the method of determining the matching position by weighting the template matching result obtained by using the high reliability rank templates having been found through template matching with all the templates, the matching position may be determined according to the steps of:

presetting a search range for each of the templates within the overlap area in the other image;

finding a degree of matching at each position within the search range having been preset for each of the templates while independently moving, within the search range, the template corresponding to the range;

selecting, for each of the templates, a position at which the degree of matching is high; and determining, as the matching position, a position frequently selected out of the positions selected for each of the templates, by weighting selection of the positions found by using each of the templates the reliability rank of which is high.

In the method using the high reliability rank template selected based on a template matching result, the matching position may be determined according to the steps of:

presetting a search range of each of the templates within the overlap area in the other image;

finding a degree of matching at each position within the search range having been preset for each of the templates while independently moving, within the search range, the template corresponding to the search range;

setting the reliability rank for each of the templates based on a maximum matching degree or how the maximum matching degree peaks;

selecting, for each of the templates, a position at which the matching degree is high; and determining, as the matching position, a position frequently selected out of the positions selected for each of the templates, by weighting selection of the positions found by using each of the templates the reliability rank of which is high.

In the case where the reliability rank is determined for an individual template, it is preferable to set the rank based on a variance of the image portion in the template. Meanwhile, in the case where the rank is set for each of the templates based on the result of template matching carried out by using all the templates, the rank may be set depending on an index value (such as the variance of the image) for each of the individual templates.

Prior to setting the template for positioning, rotation processing at least on one image may be carried out so that a relative tilt between the two images is corrected based on the overlap area. In this case, a load on the template matching processing can be reduced.

As the two images, two radiation images obtained by separately reading two stimulable phosphor sheets overlapping at least partially and recording a radiation image of a subject may be used. In this case, a boundary image in the an overlap portion of a first radiation image obtained by reading a first stimulable phosphor sheet placed farther from the subject upon photographing and partially overlapping with a second stimulable phosphor sheet placed closer to the subject may be detected so that the overlap area is detected based on the boundary image. In this manner, automatic detection of the overlap area can be carried out easily.

An image positioning processing apparatus of the present invention is an apparatus for carrying out the image positioning processing method of the present invention, and the apparatus positions two or more images overlapping at least partially, in order to reconstruct an image. The image positioning an processing apparatus comprises:

template setting means for setting, on one of two images to be positioned, at least two positioning templates in an overlap area where the one image and the other image overlap at least partially;

rank setting means for setting a reliability rank for each of the templates representing adequacy as a template;

matching position determining means for determining, based on the reliability rank, a matching position where an image portion of the one image in each of the templates almost matches up with an image portion of the other image in the overlap area; and positioning means for positioning the two images based on the matching position having been determined.

The image positioning processing apparatus may comprise template selection means for selecting one or more templates having high reliability ranks from the two or more templates described above, and the matching position determining means may determine the matching position based on the template or templates having been selected. In this case, more specifically, the matching position determining means may determine the matching position in the following manner, for example. A search range for each of the templates selected by the template selection means is set in advance within the overlap area of the other image. While each of the templates is moved independently within the corresponding search range having been set, a degree of matching is found at each position within the search range. A position at which the degree of matching is highest is selected for each of the templates, and a position which is selected frequently out of the positions having been selected for each of the templates is determined as the matching position.

The matching position determining means may determine the matching position according to the steps of:

presetting the search range for each of the templates within the overlap area in the other image;

finding a matching degree at each position within the search range having been preset while independently moving, within the search range, the template corresponding to the range;

selecting, for each of the templates, a position at which the matching degree is high;

weighting selection of the position by each of the templates the reliability rank of which is high, out of the positions selected for each of the templates; and determining, as the matching position, a position frequently selected.

In these cases, it is preferable for the rank setting means to set the reliability rank based on a variance of the image portion within the template.

Furthermore, the matching position determining means may determine the matching position according to the steps of:

presetting, within the overlap area in the other image, the search range for each of the;

finding a matching degree at each position within the search range having been preset while independently moving, within the search range, the template corresponding to the range;

selecting a position where the matching degree is high for each of the templates;

weighting selection of the position for each of the templates the reliability rank of which is high, from the positions selected for each of the templates; and determining a position of frequent selection as the matching position, while the rank setting means may set the reliability rank of each of the templates in accordance with a maximum of the matching degree or how the maximum matching degree peaks found for each of the templates by the matching position determining means. In this case, it is preferable for the rank setting means to set the rank depending on a variance of the image portion within the template.

Prior to the setting of the templates, it is preferable for the positioning processing apparatus to further comprise rotation correction means for rotating at least one of the two images so that a relative tilt between the two images is corrected based on the overlap area.

As the two images, two radiation images obtained by separately reading two stimulable phosphor sheets at least partially overlapping and storing an image of a subject may be used. In this case, it is preferable for the positioning processing apparatus to comprise overlap area detection means for detecting the overlap area by detecting a boundary image in an overlap portion of a first radiation image obtained by reading a first stimulable phosphor sheet located farther from the subject upon photographing and partially overlapping with a second stimulable phosphor sheet located closer to the subject.

According to the image positioning processing method and apparatus of the present invention, a plurality of templates are set in an area where two images overlap, and the templates are ranked according to the reliability of the templates. Based on the templates having been ranked, the two images are positioned. Therefore, the two images can be positioned more accurately than in the case of simple template matching.

BRIEF DESCRIPTION OF THE DRAWINGS

FIG. 2 is an illustration showing a radiation image of a subject recorded on two stimulable phosphor sheets partially overlapping;

DESCRIPTION OF THE PREFERRED EMBODIMENT

Hereinafter, an embodiment of a positioning processing apparatus carrying out an image positioning processing method of the present invention will be explained with reference to the accompanying drawings.

Figure 1:
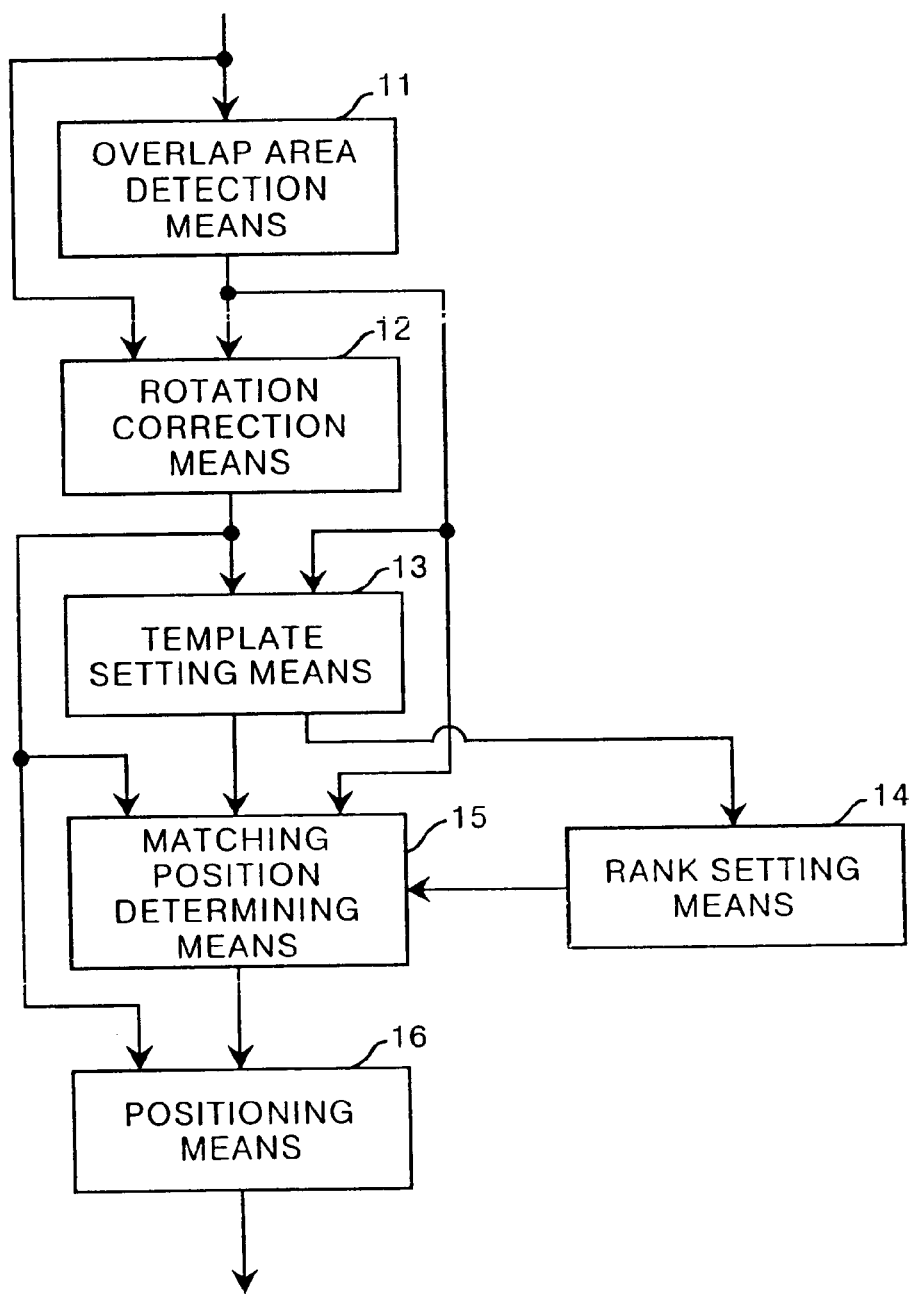
FIG. 1 is a diagram showing an embodiment of a positioning processing apparatus carrying out a positioning processing method of the present invention.

FIG. 1 is a diagram showing a configuration of the embodiment of the image positioning processing apparatus of the present invention. FIG. 2 is an illustration showing how a radiation image of a subject is recorded on two stimulable phosphor sheets overlapping partially, and FIGS. 3A and 3B show two radiation images to be positioned by the positioning processing apparatus shown in FIG. 1 after being read from the two stimulable phosphor sheets shown in FIG. 2.

The positioning processing apparatus is an apparatus for combining two radiation images P1 and P2 (FIG. 3B) obtained by separately reading two stimulable phosphor sheets 31 and 32 recording a subject radiation image P with a partial overlap, in order to reconstruct the radiation image (FIG. 3A) of a subject shown in FIG. 2. The positioning processing apparatus comprises overlap area detection means 11 for detecting overlap areas S of the two images P1 and P2 corresponding to the overlap area between the two sheets 31 and 32, rotation correction means 12 for rotating the radiation image P2 which is a lower-portion image relative to the radiation image P1 used as reference so that a relative tilt between the two images PI and P2 is corrected based on the overlap areas S having been detected, template setting means 13 for setting a plurality of templates T within an overlap area S2 in the lower-portion radiation image P2, rank setting means for setting for each of the templates T a reliability rank representing adequacy as a template, matching position determining means 15 for determining, based on the reliability ranks of the templates T, a matching position at which an image portion within each of the templates T almost matches with an image portion within an overlap area S1 of an upper-portion image P1 which is the other image to be matched, and positioning means 16 for positioning the both images P1 and P2 based on the matching position having been determined.

An operation of the overlap area detection means 11 for detecting the overlap areas S between the images P1 and P2 will be explained with reference to FIGS. 3A and 3B.

Figure 3A:
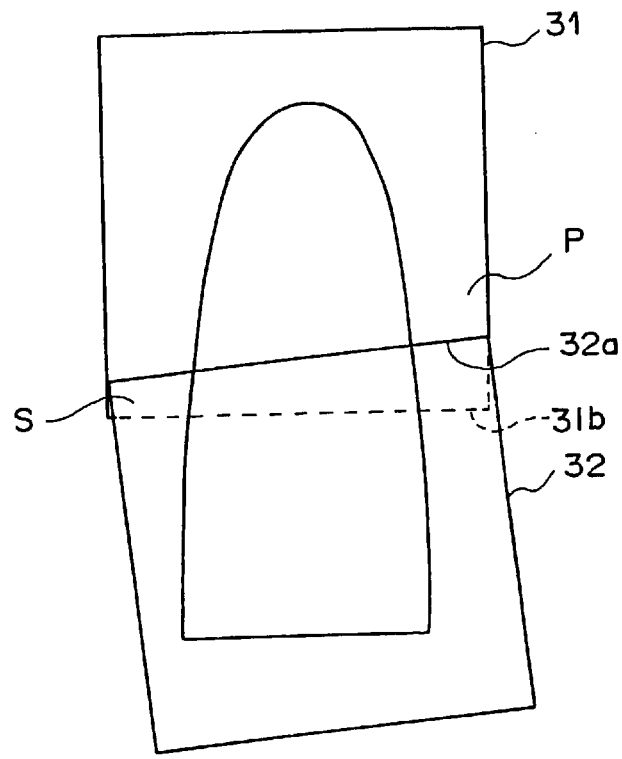
FIGS. 3A and 3B are illustrations showing two radiation images respectively read from the two stimulable phosphor sheets shown in FIG. 2.
Figure 3B:
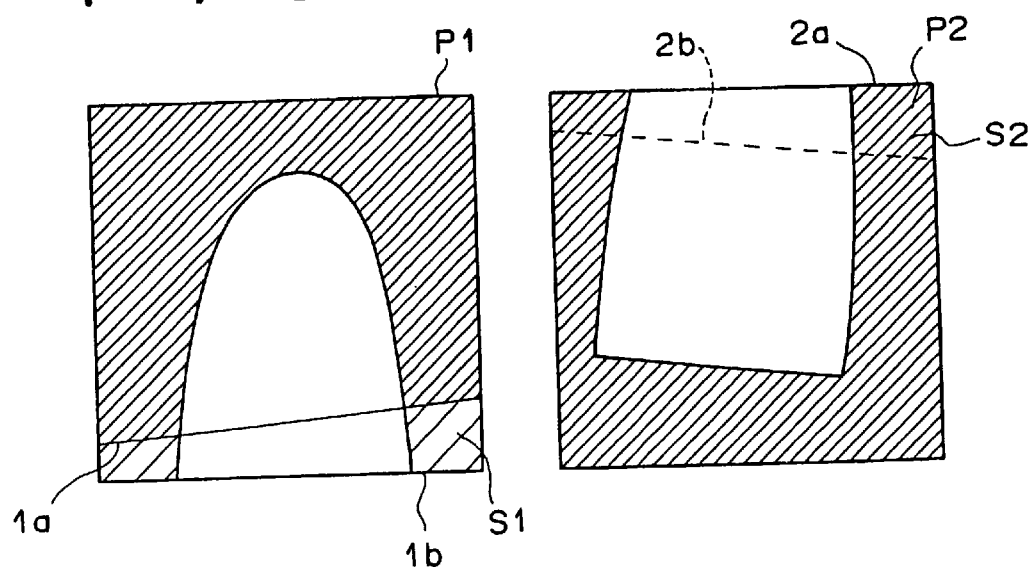

FIG. 3A shows the two stimulable phosphor sheets 31 and 32 on which the radiation image P of the subject is recorded as shown in FIG. 2. The two stimulable phosphor sheets 31 and 32 record the radiation image P in a state where the two sheets overlap partially and are tilted relatively to each other. In other words, in the overlap areas of the two sheets 31 and 32, the lower-portion sheet 32 is closer to the subject than the upper-portion sheet 31 and an upper edge 32a of the lower-portion sheet 32 is slightly tilted against a lower edge 31b of the upper-portion sheet 31.

It is needless to say that the two sheets 31 and 32 do not necessarily overlap with a tilt.

The radiation image P1 shown in FIG. 3B is read from the upper-portion sheet 31 recording one portion of the radiation image P of the subject and the radiation image P2 shown in FIG. 3B is read from the lower-portion sheet 32 recording the other portion of the radiation image P of the subject. on either of the images P1 and P2 (in this embodiment, the first radiation image P1 obtained by reading the upper-portion sheet 31 located farther from the subject), a boundary image 1a is recorded due to the overlap of the other sheet (the lower-portion sheet 32 in this embodiment) recording the other image (the second radiation image P2). The boundary image 1a is generated by reduction of a dose of radiation irradiated on the overlap area of the sheet 31 caused by absorbance and diffusion of the radiation by the other sheet 32 covering the overlap area. In other words, in this embodiment, the radiation is absorbed and diffused by the lower-portion sheet 32 and the boundary image 1a appears in the first radiation image P1 corresponding to a position of the upper edge 32a of the lower-portion sheet 32 (FIG. 3B).

The overlap area detection means 11 detects the boundary image 1a from the two images P1 and P2 input thereto. More specifically, the boundary image 1a is detected for each of the radiation images P1 and P2 in the following manner.

Figure 4A:
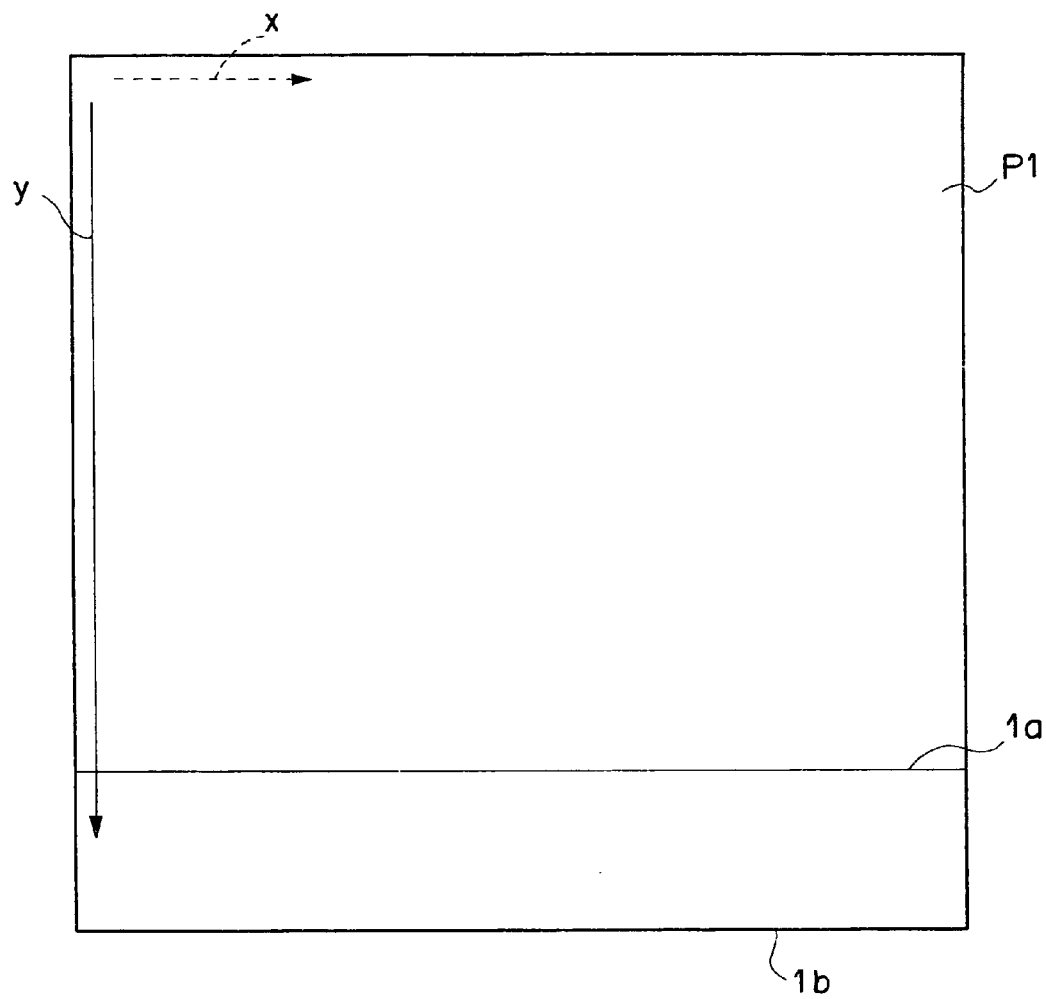
FIGS. 4A and 4B are diagrams showing an operation of boundary image detection.
Figure 4B:
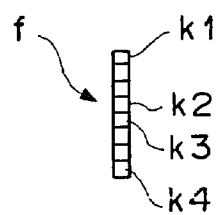

First, a filter f having 8×1 pixels shown in FIG. 4B is shifted by one pixel each time along a direction X in the first radiation image P1 shown in FIG. 4A. In each movement, an evaluation value M is calculated using values of the radiation image P1 each corresponding to a first pixel k1, a fourth pixel k2, a fifth pixel k3, and an eighth pixel k4 of the filter f (hereinafter, the values of the radiation image P1 corresponding to k1, k2, k3 and k4 are called K1, K2, K3 and K4, respectively) according to the following logic equation (1):

$$\text{If } ((K1>K4) \text{ and } (K2>K3)) \text{ then } M=M+1 \text{ else if } ((K1<K4) \text{ and } (K2<K3)) \text{ then } M=M-1 \text{ else } M=M\pm0 \quad (1)$$

This logic equation means that "+1" is added to the evaluation value M when the value K1 of the first pixel k1 is larger than the value K4 of the eighth pixel k4 (that is, density is higher at k1) and the value K2 of the fourth pixel k2 is larger than the value K3 of the fifth pixel k3 (that is, the density is higher at k2) at the same time, since the boundary image 1a having a large density change is highly likely to exist between the fourth pixel k2 and the fifth pixel k3. Meanwhile, "−1" is added to the evaluation value M when the value K1 of the first pixel k1 is smaller than the value K4 of the eighth pixel k4 and the value K2 of the fourth pixel k2 is smaller than the value K3 of the fifth pixel k3 at the same time, since the boundary image 1a should have a reverse density change. In other cases, the evaluation value M is not changed (M=M±0).

The value of M at the time the filter f has been moved from one end of the image to the other end thereof along the direction X is used as the evaluation value M of the line (the line extending along the direction X).

The filter f is then shifted by one pixel along a direction Y shown in FIG. 4A and the same procedure is repeated to find the evaluation value M of the line having been moved by one pixel in the direction Y. Thereafter, the filter f is moved in the direction Y by one pixel each time and the evaluation value M for each line is found. In the line having a largest positive value M, the boundary image 1a exists between the fourth and fifth pixels k2 and k3 of the filter f.

Detection of the boundary image 1a according to this algorithm is substantially effective in the case where the boundary image 1a appears almost parallel to the upper edge or a lower edge 1b of the radiation image P1. However, as in this embodiment, when the boundary image 1a is tilted to the upper edge or the lower edge 1b, the evaluation value M becomes almost constant over several lines and the boundary image 1a is not specified.

When the boundary image 1a has a tilt, a portion of the boundary image 1a is searched for at a position near a right edge and at a position near a left edge of the radiation image P1 within a range of the several lines where the value M is almost the same. The boundary image portions detected near the both edges are then connected to find the boundary image 1a.

It is possible to detect an image edge by using differential processing for evaluation by using only a difference (K2−K3) between the values K2 and K3 of the two neighboring pixels k2 and k3. However, this method is easily affected by noise and the recorded image itself. Therefore, the boundary image 1a is detected accurately by the evaluation using the filter f having an elongated shape in the vertical direction.

However, the image edge detecting method described above is not necessarily excluded. For example, a gradient of density (the value of the radiation image) between two neighboring pixels in the radiation image P1 is found while the pixels are shifted along the Y direction one by one. Two neighboring pixels whose upper pixel has a higher density than the lower pixel are found as a candidate for the boundary image position. This search along the Y direction is repeated while the search position is shifted by one pixel in the direction orthogonal to the Y direction. A line along which the candidates of the boundary image position exist most frequently in the X direction almost orthogonal to the Y direction is then detected as the boundary image 1a. Alternatively, the boundary image 1a may be detected by using Huff transformation.

The overlap area detection means 11 further detects the overlap areas S of the images P1 and P2 (the overlap areas S1 in the image P1 and the overlap area S2 in the image P2), based on the boundary image 1a detected in the first radiation image P1. The overlap areas S are detected in the following manner. For the first radiation image P1 where the boundary image 1a has been detected, an area sandwiched between the boundary image 1a and the lower edge 1b is detected as the overlap area S1 in the first radiation image P1. For the second radiation image P2 where the boundary image has not been detected, an area sandwiched by an upper edge 2a and a line 2b corresponding to the lower edge 1b of the first radiation image P1 (shown by a dashed line in FIG. 3B) when the upper edge 2a is matched up with the boundary image 1a of the first radiation image P1 is detected as the overlap area S2 in the second radiation image P2. In this manner, the overlap area detection means 11 detects the overlap areas S1 and S2 of the radiation images P1 and P2.

Figure 5:
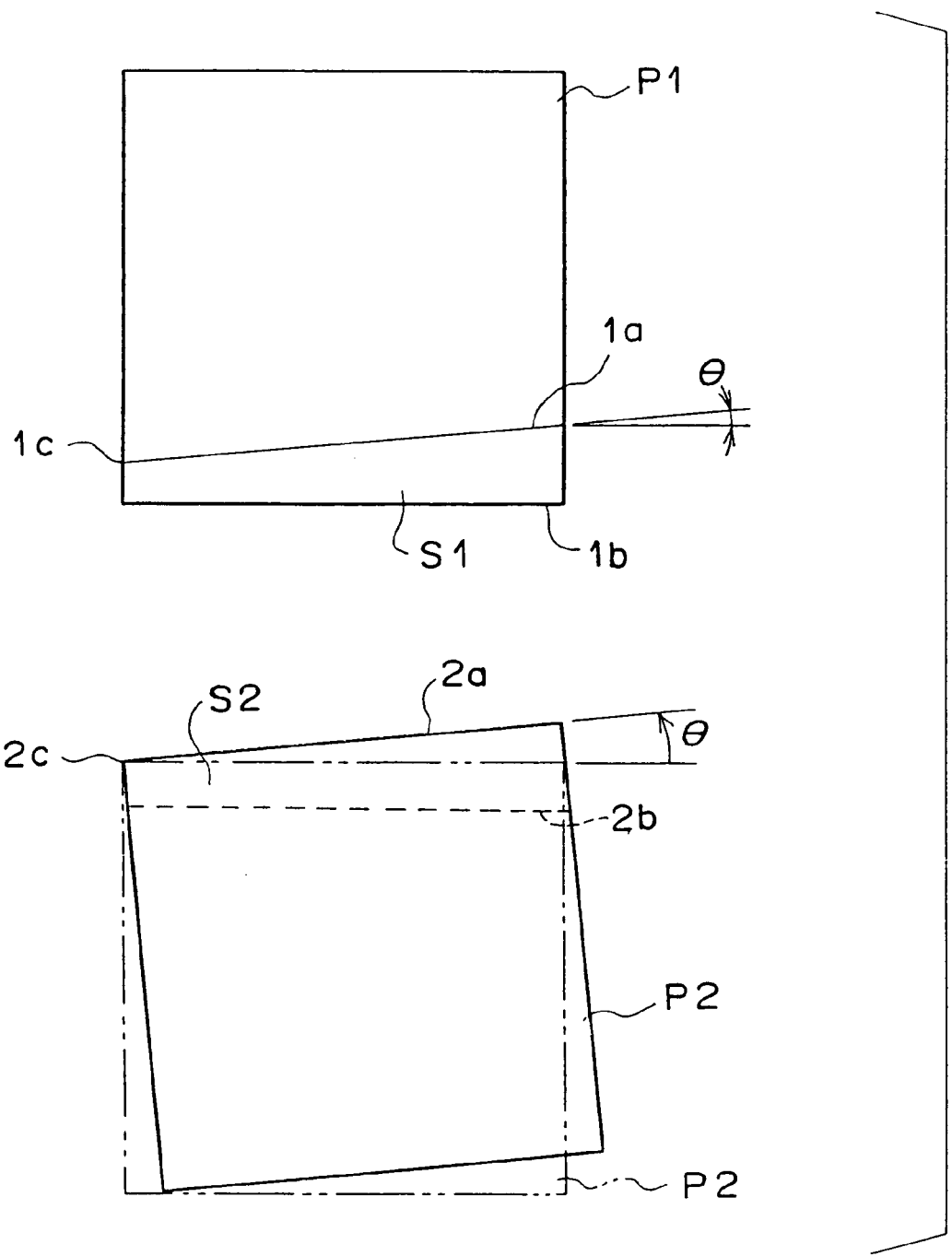
FIG. 5 is a diagram showing rotation correction processing.

The rotation correction means 12 rotates the second radiation image P2 so that the overlap areas S1 and S2 detected by the overlap area detection means 11 completely overlap. In other words, the second radiation image P2 is rotated relative to the first radiation image P1 as shown in FIG. 5, by an angle θ which is an angle the boundary image 1a makes with a level line, so that the upper edge 2a of the second radiation image P2 matches up with the boundary image 1a of the first radiation image P1. When the upper edge 2a of the second radiation image P2 is matched up with the boundary image 1a of the first radiation image P1, a leftmost edge 1c of the boundary image 1a is matched up with a leftmost edge 2c of the upper edge 2a.

Figure 6A:
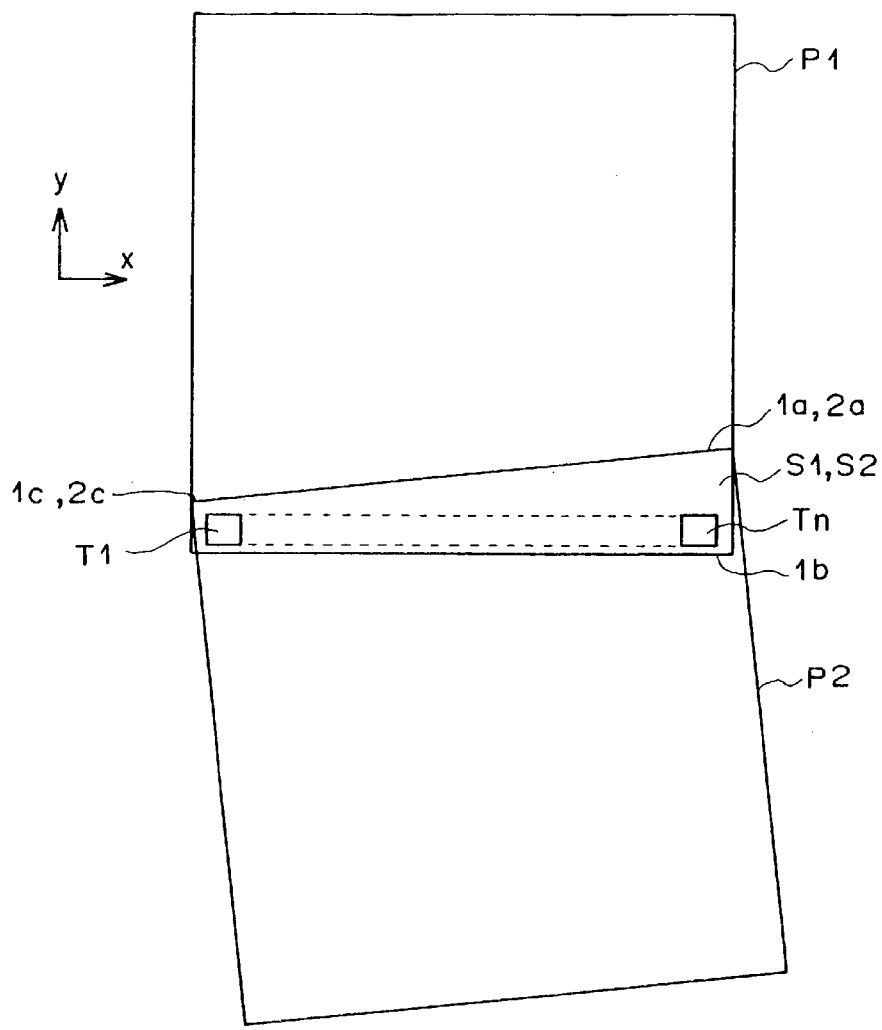
FIGS. 6A and 6B are diagrams showing how templates are set.
Figure 6B:
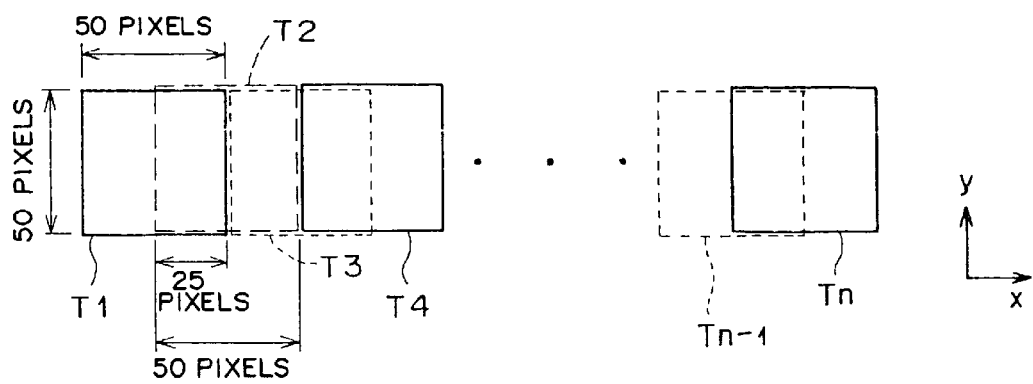

The template setting means 13 sets a plurality of templates T (T1, T2, . . . , Tn) for positioning, within the overlap area S2 in the second radiation image P2. Each of these templates (50 pixels each in x and y directions) is set partially covering a neighboring template by 25 pixels in the x direction as shown in FIG. 6.

Figure 7:
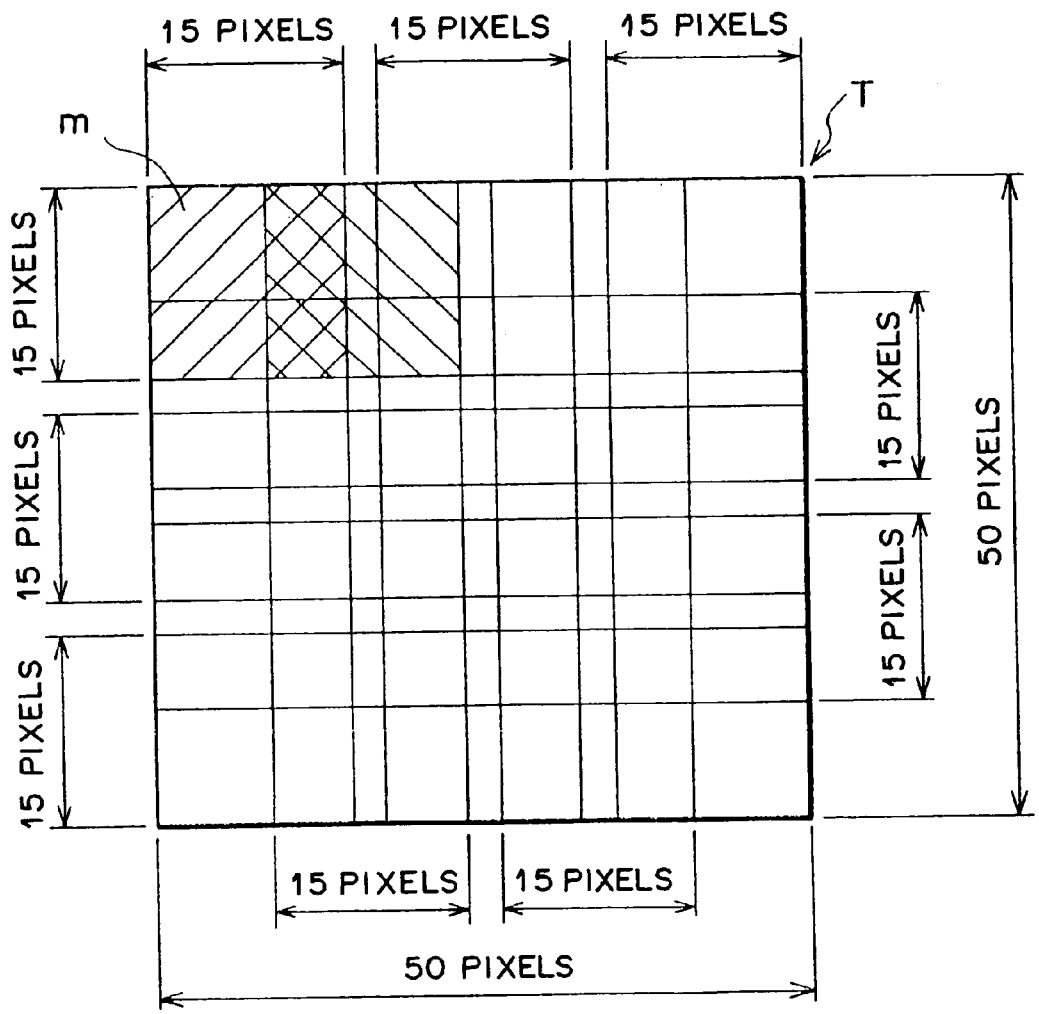
FIG. 7 is a diagram showing how an index value is calculated.

The rank setting means 14 finds, for each of the templates T1, T2, . . . , Tn, a variance of the pixel values for each of 25 small areas m having 15×15 pixels therein and partially overlapping each other, as shown in FIG. 7. The 25 variance values are then added together and used as an index for each of the templates. A template having a high index value includes within the template a characteristic image portion suitable for template matching, such as an edge portion (for example, a bone edge or a marker edge in the case of an image photographed by using a marker for positioning). Therefore, the template is adequate. Meanwhile, a template having a small index value does not include a characteristic image portion therein. Therefore, the adequacy as a template is low for the template. The rank setting means 14 therefore sets a reliability rank for each of the templates, depending on the index value. As these ranks, a rank A (whose index value exceeds 1000) meaning substantial adequacy as a template, a rank B (whose index value is between 100 and 1000) second to the rank A, and a rank C (whose index value is smaller than 100) having insufficient adequacy are used, for example. The ranks are not necessarily limited to these three ranks and 4 ranks or 2 ranks may be used, for example. The reliability ranks may be consecutive values.

In this case, the variance is found for each of the small areas m and the sum of the variance is used as the index value. This is because the simple variance within each of the templates T becomes comparatively large in the case where an image portion within any one of the templates T has gradually changing density and does not include a characteristic image portion. In this manner, the reliability is prevented from setting high regardless of its insufficient adequacy. In the case where the size of each of the templates T is changed, the area m of 15×15 pixels is not changed while only the overlap area of m needs to be changed to find the index value. This is advantageous for effectively using the algorithm of calculating the index value.

Figure 8:
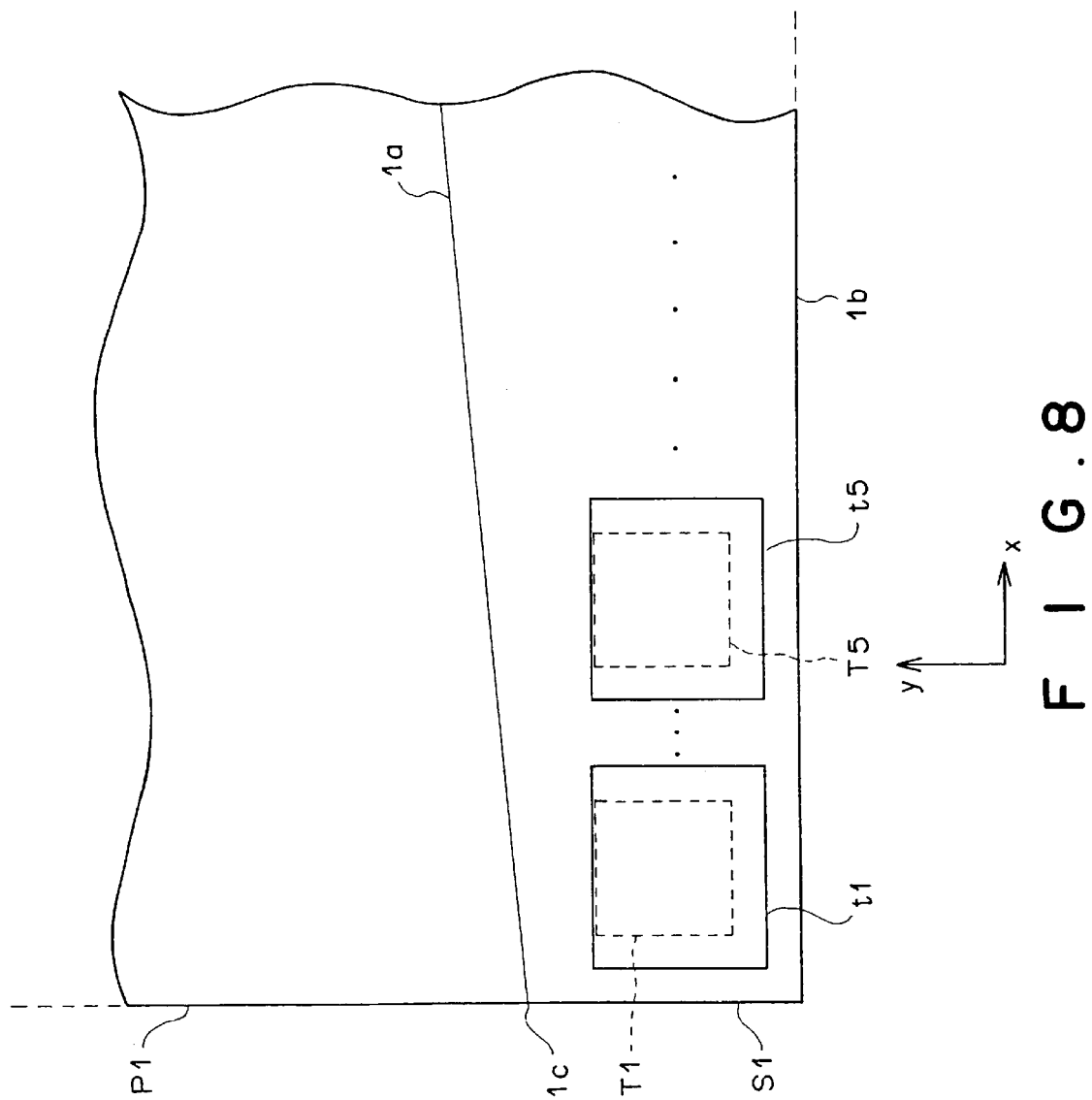
FIG. 8 is a diagram showing a search range.

The matching position determining means 15 sets a search range t (hereinafter called t1, t2, . . . tn for the templates T1, T2, . . . Tn, respectively) having a larger area (for example, an area larger in the direction of x and its opposite direction by 20 pixels each and larger in the direction opposite of y by 22 pixels) than the area of each of the templates T at respective corresponding locations (reference locations, shown by dashed lines in FIG. 8) in the overlap area S1 of the radiation image P1 on which the templates T are not set. The matching position setting means independently translates each of the templates T along the x direction and along the y direction within the search range t thereof, such as the template T1 moved along the x and y directions within the search range t1 and the template T2 moved along the x and y directions within the search range t2. The matching position determining means 15 finds, at each position moved from each of the reference locations, a degree of matching (for example, a normalized cross-correlation value) between the image within each of the templates T and an image within each search range while translating each of the templates T as has been described above. For each of the templates T, template matching to find a position at which the matching degree becomes highest is carried out. The matching position determining means 15 determines positions of the highest matching degree found for each of the templates as the matching position at which the images are positioned, by weighting the positions according to the reliability ranks. In other words, the positions of the rank A templates having high reliability are weighted more than the positions of the templates ranked B or lower. In this manner, the matching position is determined by weighting the result of the template matching using the templates having more adequacies.

Figure 9A:
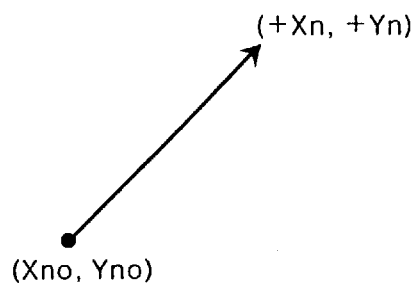
FIGS. 9A and 9B are diagrams showing processing for suppressing frequency diffusion due to an error in a template position.

More specifically, let a center position of each of the templates before movement be (Xn0, Yn0) as shown in FIG. 9A and let a position of each of the templates relative to the center position before movement be (+Xn, +Yn), and frequency is found at each position (+Xn, +Yn). For a position of a rank A template, the frequency is weighted to be double of the frequency for a template ranked B or lower, for example. In this manner, the frequency for the templates ranked A becomes relatively higher. The position of highest frequency is then determined as the matching position. The frequency for the rank A templates may be accumulated as 1 or 2 or more, and the frequency for the templates ranked B or lower may be 0. In this manner, the matching position may be determined according to the frequency for only the templates ranked A.

The position of each of the templates may have an error to some degree, even if an A rank template is used. Therefore, the matching position may not be determined specifically since the positions are not concentrated at a specific position due to the error, although concentrated in a small area.

Figure 9B:
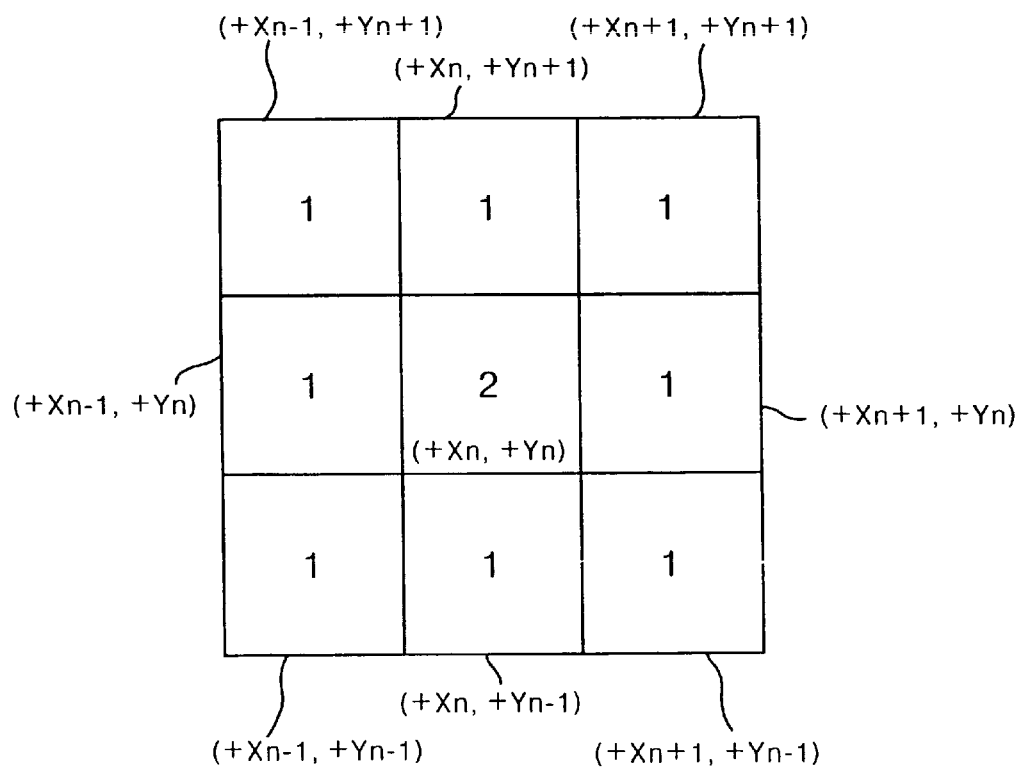

Therefore, as shown in FIG. 9B, let the position (+Xn, +Yn) of highest matching degree be the center position of each of the templates and let 8 positions surrounding the center position be (+Xn+1, +Yn+1), (+Xn+1, +Yn), (+Xn+1, Yn−1), (+Xn, +Yn+1), (+Xn, +Yn−1), (+Xn−1, +Yn+1), (+Xn−1, +Yn), and (+Xn−1, +Yn−1). For all the templates, this operation is repeated by setting the frequency of the center position (+Xn, +Yn) to be 2 and by setting the frequency of the 8 surrounding positions to be 1. In this manner, the frequency can be concentrated at a specific position and the matching position tends to be determined uniquely. Therefore, this manner is preferable. In the case where the matching position is virtually determined based on the positions found only for the rank A templates, this method can be applicable as it is. However, in the case where not only the rank A templates but also the templates ranked B or lower are used at the same time, weighting according to the reliability ranks and prevention of the frequency diffusion due to the error cab be realized at the same time by setting the frequency of the center position and its surrounding positions of the rank A templates larger than those of the templates ranked B or lower. For example, the frequency of each of the rank A templates is set 4 and 2 at the center position thereof and at the surrounding positions respectively, while the frequency of each of the templates ranked B or lower is set 1 and 0 at the center position thereof and at its surrounding positions, respectively.

The matching position determining mean 15 determines the matching position not only according to the frequency of the positions but also by finding a weighted mean position with the high-rank templates weighted heavier than low-rank templates. In this case, the matching position may be determined virtually according to a mean position found by using the high-rank templates alone. In the case where no rank A template exists, the matching position is determined as a mean position found for the rank B templates.

The positioning means 16 positions the two images P1 and P2 based on the matching position determined by the matching position determining means 15.

An operation of the positioning processing apparatus according to this embodiment will be explained next.

The overlap area detection means 11 detects the boundary image 1a appearing on either the radiation image P1 or P2 having been input thereto and detects the overlap areas S1 and S2 in the images P1 and P2 respectively, based on the boundary image 1a having been found.

The rotation correction means 12 rotates the second radiation image P2 relative to the first radiation image P1 so that the two overlap areas S1 and S2 having been detected by the overlap area detection means 11 overlap completely. At this time, the leftmost edge 2c of the upper edge 2a of the second radiation image P2 is matched up with the leftmost edge 1c of the boundary image 1a of the first radiation image P1.

After the overlap area S2 in the second radiation image P2 rotated in the above manner has been found, the template setting means 13 sets each of the templates T within the overlap areas S2. The rank setting means 14 calculates the index value for each of the templates T set by the template setting means 13, and sets, for each of the templates T, the reliability rank corresponding to the index value.

The matching position determining means 15 sets the search range t (t1, t2, . . . tn) for each of the templates T within the overlap area S1 of the other radiation image P1, and carries out template matching while moving each of the templates independently within each search range thereof. The position of highest matching degree is found for each of the templates T. The matching position determining means 15 then determines the matching position to which the images are moved, by weighting each of the positions having the large degree of matching for each of the templates T according to the reliability rank thereof, as has been described above. The matching position determined by weighting the template matching result using the adequate templates, that is, using the high reliability rank templates more than the template matching result using the templates ranked lower is a position of higher matching accuracy than a position conventionally determined without weighting.

The positioning means 16 positions the images P1 and P2 based on this matching position determined by the matching position determining means 15.

As has been described above, according to the positioning processing apparatus in this embodiment, the templates are set in the overlap area between the two images and the reliability rank is set for each of the templates. Based on the templates having been ranked, the two images are positioned by finding the matching position through weighting of the high-rank templates. Therefore, positioning of the two images can be carried out more accurately than in the case of positioning using a matching position found through template matching using all the templates indiscriminately.

The positioning processing for two images by the image positioning processing apparatus according to this embodiment has been explained. However, this apparatus is applicable to two images out of three or more images comprising one entire image. The two images to be processed by the positioning processing method and apparatus of the present invention are not necessarily limited to images partially overlapping as in the above embodiment. Two images almost completely overlap can also be processed by this method and apparatus. In this case, the boundary image detecting process and the overlap area detection means 11 for detecting the overlap areas based on the boundary image are not necessary for the positioning processing apparatus in this embodiment.

In this embodiment, the second radiation image P2 partially covers the first radiation image P1, and the two images are positioned. However, on the contrary, the first radiation image P1 may partially cover the second radiation image P2.

In this embodiment, the rotation means 12 rotates the lower image P2 relative to the upper image P1. However, the upper image P1 may be rotated relative to the lower image P2. Alternatively, the both images P1 and P2 may be rotated relative to a predetermined virtual reference angle. The rotation means 12 is not necessary for the positioning processing apparatus when the boundary image appearing on one image is not tilted and is parallel to the upper and lower edges of the images at all times.

The templates T set by the template setting means 13 are not limited to the templates of 50×50 pixels as in this embodiment, and can be changed adequately according to the size of the overlap areas S. Furthermore, the templates are not necessarily set on the image where the boundary image has not been detected (the radiation image P2 in this embodiment), and the templates may be set on the image where the boundary image has been detected (the radiation image P1 in this embodiment).

Likewise, the size of the search range t set by the matching position determining means 15 is not necessarily limited to the size used in this embodiment. Each search range t set by the matching position determining means 15 in this embodiment is extended only toward the bottom of FIG. 8 in the y direction beyond the reference location of each of the templates T (shown by the dashed lines in FIG. 8). This is because the upper edge 2a of the second radiation image P2 may be positioned below the boundary image 1a although the upper edge 2a is never positioned upward beyond the boundary image 1a. In other words, when the radiation images P1 and P2 are read from the stimulable phosphor sheets 31 and 32, image portions may not be read at reading start positions of the sheets 31 and 32. In this case, an image portion recorded near the upper edge 32a of the second stimulable phosphor sheet 32 is lost upon reading and an image portion near the upper edge 2a of the second radiation image P2 obtained by reading is an image portion recorded in an area lower than the upper edge 32a of the sheet 32.

The rank setting means 14 does not necessarily set the rank independently for each of the templates regardless of the template matching result as has been described in this embodiment. In order to improve the accuracy of the reliability rank, the rank setting means may set the ranks depending on the result of template matching carried out by the matching position determining means 15.

Figure 10:
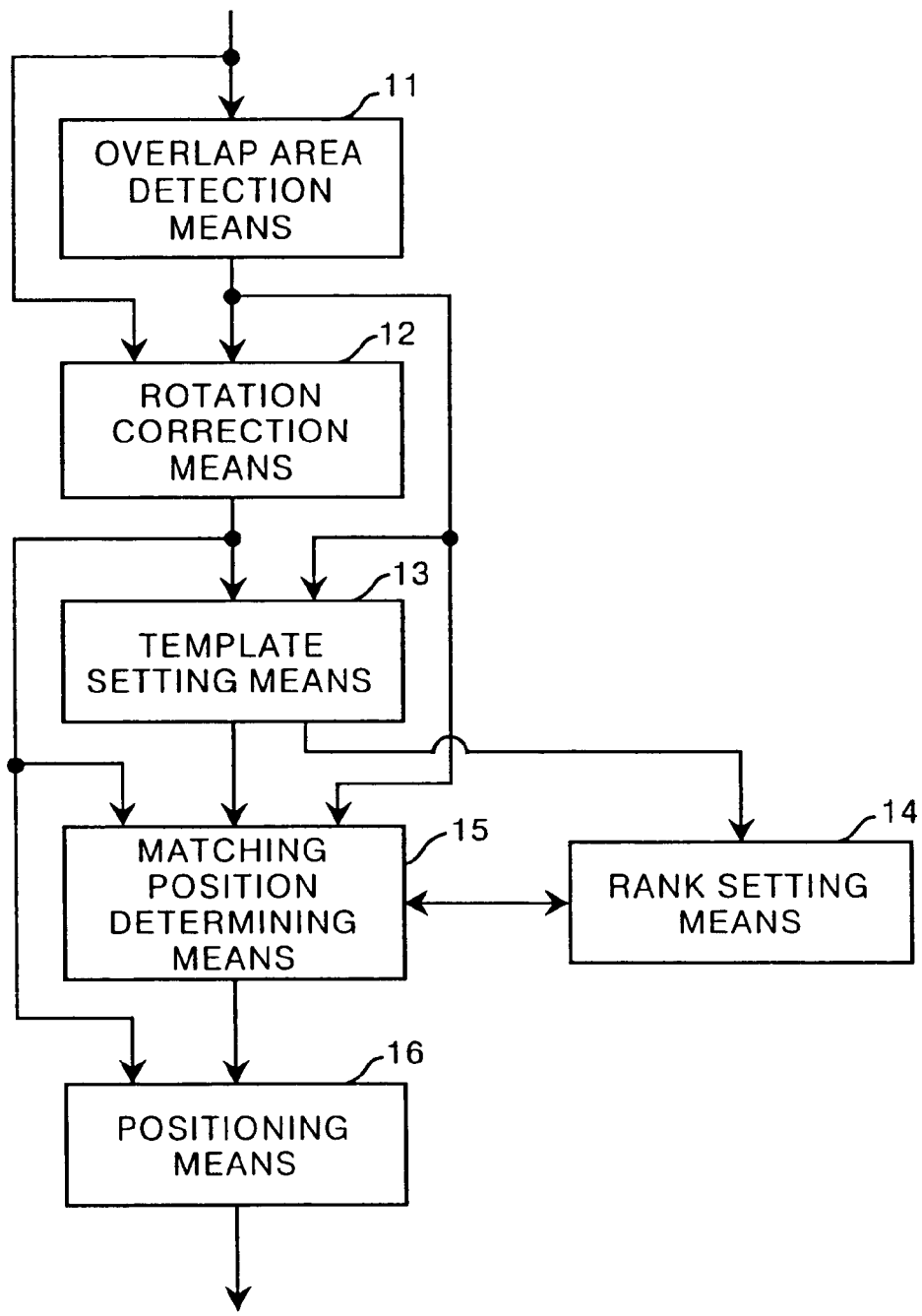
FIG. 10 is a diagram showing another embodiment of the positioning processing apparatus of the present invention.

In other words, as shown in FIG. 10, the ranks may be set by the rank setting means 14 according to whether or not the highest matching degree for each of the templates exceeds a predetermined threshold value in the result of template matching carried out by the matching position determining means 15. For example, when the highest degree of matching (correlation value, for example) for each of the templates exceeds 0.7, the templates are ranked A since they have high reliability. Templates having highest matching degrees between 0.5 and 0.7 or equal to 0.7 have B as their ranks, since the templates have reliability to some degree. Other templates are ranked C.

The reliability ranks may be set by using both the index values found independently for each of the templates and the result of template matching. For example, templates having index values exceeding 1000 and the highest degree of matching exceeding 0.7 have rank A. Templates having the index values between 100 and 1000 or equal to 1000 and the highest degrees of matching exceeding 0.7 are ranked B. Templates having the index values equal to or smaller than 100 or having the highest degrees of matching smaller than 0.7 are ranked C.

In the case where the rank setting means according to this aspect is adopted, the matching position determining means 15 may determine the matching position based on the frequency of the positions weighted according to the ranks, or based on the weighted mean of the position found by using the ranks. Furthermore, the matching position determining means 15 may determine the matching position based on the frequency of the positions for the rank A templates alone or a mean position for the high-rank templates alone.

The rank setting means 14 may determine the reliability rank according to how the highest matching degree peaks, as has been described above. The peak of the highest matching degree means a value resulted in subtraction from a highest matching degree Rmax of a highest matching degree R at a position separated from a position at which the matching degree takes the highest value Rmax (this position is called a temporary matching position) by some distance (for example, at least 3 pixels away in vertical and horizontal directions from the temporary matching position). In other words, when the peak is sharp, the correlation value is small at positions except for the temporary matching position, and the temporary matching position is highly likely to be the true matching position. Meanwhile, when the peak is wide, credibility of the temporary matching position as the true matching position is suspicious, since the correlation value does not differ between the temporary position and other positions. Therefore, it is effective to set the reliability ranks based on how the highest matching degree peaks.

The ranks may be set by using the peak of highest matching degree in combination with the index values found independently for each of the templates or a combination with the degree of highest matching itself. For example, templates having the index values exceeding 1000 and the degree of highest matching exceeding 0.7 as well as a value exceeding 0.07 for representing how the highest matching degree peaks have the rank A. Templates having the index values between 100 and 1000 or equal to 1000 and the highest degree of matching exceeding 0.7 as well as the value for the peak between 0.01 and 0.07 or equal to 0.07 are ranked as the B templates. Templates other than the above are ranked C.

Figure 11:
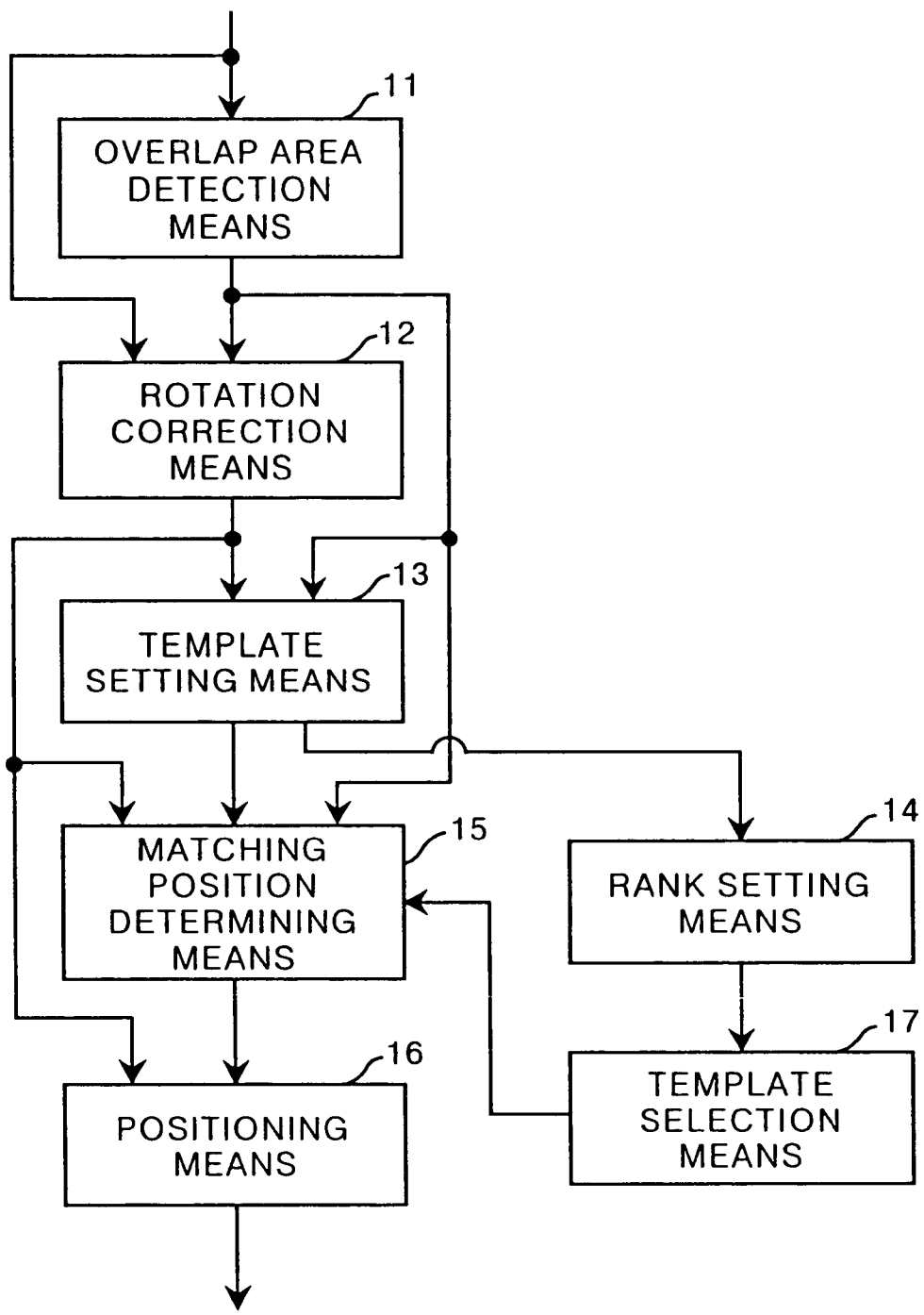
FIG. 11 is a diagram showing an embodiment of the positioning processing apparatus of the present invention comprising template selection means.

As shown in FIG. 11, template selection means 17 may be used for selecting templates having the reliability ranks equal to or higher than a predetermined rank out of the templates whose reliability ranks have been determined by the rank setting means 14. The matching position determining means 15 sets the search range t corresponding to only the templates having been selected by the selection means 17 and carries out template matching based on the selected templates and the search range having been set. The matching position determining means 15 determines the matching position by using the positions having the high matching degree obtained by the template matching. By selecting the templates having high reliability in advance and by carrying out the template matching by using only the selected templates, the matching position having high reliability can be obtained and processing time for the template matching and for determining the matching position can be reduced than in the case of the positioning processing apparatus according to the embodiment described above, which is advantageous in terms of speeding up the processing. In this case, it is preferable for the rank setting means 14 to determine the reliability rank for each individual template (by using a method adopting the variance as the index value or the like) in terms of operation time reduction.

Figure 12:
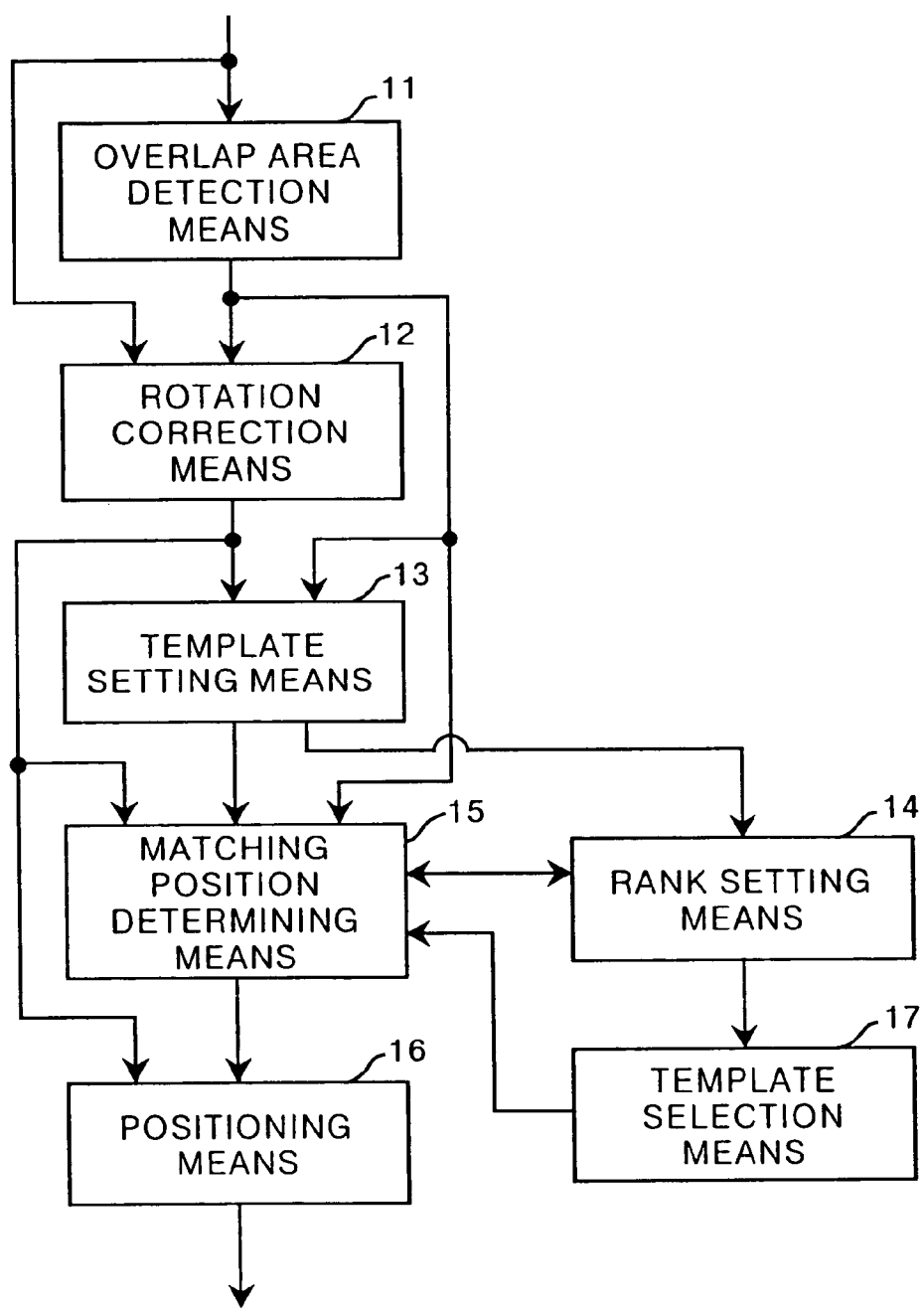
FIG. 12 is a diagram showing another embodiment of the positioning processing apparatus of the present invention comprising the selection means.

However, as in the embodiment shown in FIG. 10, the matching position determining means 15 may carry out template matching by using all the templates so that the rank setting means 14 can determine the reliability rank for each of the templates. The selection means 17 selects only the high-rank templates out of the templates whose ranks have been set, and the matching position determining means 15 determines the matching position based on the positions of only the selected templates (see FIG. 12). In this case, the processing time for the template matching cannot be reduced. However, the processing time necessary for determining the matching position can be reduced, which is more advantageous than the positioning processing apparatuses shown in FIG. 1 or 10. This embodiment is virtually the same as the embodiment where the matching position determining means 15 in the embodiment of the positioning processing apparatus shown in FIG. 10 determines the matching position based on the positions of the high-rank templates alone.

In the positioning processing described above, the rotation correction means 12 rotates at least either the image P1 or the image P2 so that the overlap areas S1 and S2 overlap completely. This processing is based on a premise that the boundary image 1$a$ of the image P1 matches up with the upper edge 2$a$ of the other image P2. However, the matching position cannot be determined in some cases not only when the image portion at the upper edge of the stimulable phosphor sheet is not read upon reading the sheet but also when reading of the image is carried out in a state where the image is tilted.

Therefore, in template matching by the matching position determining means, a first matching position is determined only for six templates T1, T2, . . . , T6 from the left out of all the templates, prior to finding the matching position by using all the templates. A second matching position is then found for six templates Tn-5, Tn-4, . . . Tn from the right, and the center pixels of the six templates from the left are positioned at the first matching position while the center pixels of the six templates from the right are positioned at the second matching position. The lower image P2 is further rotated in this manner, and the matching position is determined after this rotation, as has been described above.

Figure 13:
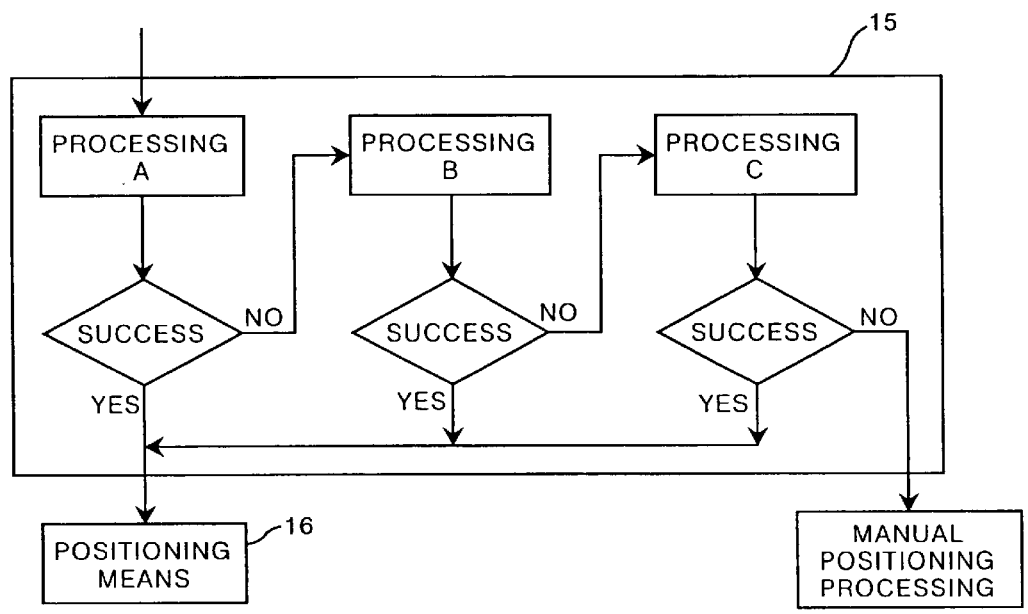
FIG. 13 is a diagram showing processing of determining a matching position through a plurality of steps.

Another positioning processing procedure may also be used. For example, let the matching position determination processing using the further rotation processing described above be processing A and let the matching positioning determination processing without the further rotation as has been described in this embodiment be processing B. Let the processing using the search range t in the processing B shown in FIG. 8 limited to the length of the template T ((50 pixels in the y direction)×(90 pixels in the x direction [50 pixels+20 pixels and 20 pixels])) be processing C. As shown in FIG. 13, in a first step, the matching position is determined according to the processing A in the case where the first and the second matching positions can be determined for the six templates from the left and the six templates from the right, respectively. In the case where at least either the first or the second matching position is not determined, the matching position is then found by using the processing B in a second step. When the matching position is not determined by the processing B (such as the case where the rank A template does not exist), the matching position is determined according to the processing C in a third step. When the matching position is not determined by using even the processing C, the images P1 and P2 are positioned manually on a display screen in a fourth step.

Each parameter (such as the size of the template (the number of pixels), the template setting position, the number of templates, the search range for template matching, and the threshold value for setting the reliability rank) for positioning processing in the above embodiment may be determined in advance. Alternatively, the parameters may be set depending on pixel density and/or a portion of the subject. For example, when the pixel density is high, the search range is extended since the template size is large. By setting the parameters depending on the pixel density and/or the portion of the subject, more adequate positioning processing can be carried out. These parameters may be changed adequately by an operator, depending on the pixel density and the subject portion. In the case where the parameters have been set for a specific pixel density (such as 5 pixels/mm) and positioning processing is carried out on an image having a different pixel density, the image may be converted into an image having the pixel density suitable for the parameters (5 pixels/mm) and the positioning processing is carried out thereafter.

What is claimed is:

1. An image positioning processing method for positioning two or more images overlapping at least partially to reconstruct an image, and the method comprising the steps of:

setting, on one of two images to be positioned, at least two positioning templates in an overlap area where the one image and the other image overlap at least partially;

setting a reliability rank for each of the templates representing adequacy as a template;

determining, based on the reliability rank, a matching position where an image portion of the one image in each of the templates almost matches up with an image portion of the other image in the overlap area; and positioning the two images based on the matching position having been determined, wherein said at least two positioning templates at least partially overlap.

2. An image positioning processing method as claimed in claim 1, further comprising the steps of:

selecting one or more templates the reliability ranks of which are high from the two or more templates prior to determining the matching position; and determining the matching position based on the one or more templates having been selected.

3. An image positioning processing method as claimed in claim 2, further comprising the steps of:

presetting a search range of each of the templates having been selected, within the overlap area in the other image;

finding a degree of matching at each position within the search range having been preset for each of the templates while independently moving, within the search range, the template corresponding to the range;

selecting a position at which the degree of matching is highest for each of the templates; and determining, as the matching position, a position frequently selected out of the positions selected for each of the templates.

4. An image positioning processing method as claimed in claim 1, further comprising the steps of:

presetting a search range of each of the templates within the overlap area in the other image;

finding a degree of matching at each position within the search range having been preset for each of the templates while independently moving, within the search range, the template corresponding to the search range;

selecting, for each of the templates, a position at which the matching degree is high; and determining, as the matching position, a position frequently selected out of the positions selected for each of the templates, by weighting selection of the positions found by using each of the templates the reliability rank of which is high.

5. An image positioning processing method as claimed in any one of claims 1 to 4, wherein the reliability rank is set based on a variance of the image portion within the template.

6. An image positioning processing method as claimed in claim 1, further comprising the steps of:

presetting a search range of each of the templates within the overlap area in the other image;

finding a degree of matching at each position within the search range having been preset for each of the templates while independently moving, within the search range, the template corresponding to the search range;

setting the reliability rank for each of the templates based on a maximum matching degree or how the maximum matching degree peaks;

selecting, for each of the templates, a position at which the matching degree is high; and determining, as the matching position, a position frequently selected out of the positions selected for each of the templates, by weighting selection of the positions found by using each of the templates the reliability rank of which is high.

7. An image positioning processing method as claimed in any one of claims 1–4 and 6, further comprising the step of:

rotating at least one of the images prior to setting the templates so that a relative tilt between the two images is corrected based on the overlap area.

8. An image positioning processing method as claimed in any one of claims 1–4 and 6, wherein the two images are two radiation images obtained by separately reading two stimulable phosphor sheets overlapping at least partially and recording a radiation image of a subject.

9. An image positioning processing method as claimed in any one of claims 1–4 and 6, further comprising the steps of:

detecting a boundary image in an overlap portion of a first radiation image obtained by reading a first stimulable phosphor sheet placed farther from the subject upon photographing and overlapping with a second stimulable phosphor sheet placed closer to the subject; and detecting the overlap area based on the boundary image having been detected.

10. An image positioning processing apparatus for positioning two or more images overlapping at least partially, in order to reconstruct an image, the apparatus comprising:

template setting means for setting, on one of two images to be positioned, at least two positioning templates in an overlap area where the one image and the other image overlap at least partially;

rank setting means for setting a reliability rank for each of the templates representing adequacy as a template;

matching position determining means for determining, based on the reliability rank, a matching position where an image portion of the one image in each of the templates almost matches up with an image portion of the other image in the overlap area; and positioning means for positioning the two images based on the matching position having been determined, wherein said at least two positioning templates at least partially overlap.

11. An image positioning processing apparatus as claimed in claim 10, further comprising template selection means for selecting one or more templates the reliability ranks of which are high, from the two or more templates, wherein the matching position determining means determines the matching position based on the one or more templates having been selected.

12. An image positioning processing apparatus as claimed in claim 11, wherein the matching position determining means determines the matching position according to the steps of:

presetting, within the overlap area of the other image, a search range for each of the templates having been selected by the template selection means;

finding a matching degree at each position within the search range having been set while independently moving each template corresponding to the range;

selecting, for each of the templates, a position at which the matching degree is highest; and determining, as the matching position, a position frequently selected out of the positions selected for each of the templates.

13. An image positioning processing apparatus as claimed in claim 10, wherein the matching position determining means determines the matching position according to the steps of:

presetting the search range for each of the templates within the overlap area of the other image;

finding a matching degree at each position within the search range having been preset while independently moving, within the search range, the template corresponding to the range;

selecting, for each of the templates, a position at which the matching degree is high;

weighting selection of the position by each of the templates the reliability rank of which is high, out of the positions selected for each of the templates; and determining, as the matching position, a position frequently selected.

14. An image positioning processing apparatus as claimed in any one of claims 10 to 13, wherein the rank setting means sets the reliability rank based on a variance of the image portion within the template.

15. An image positioning processing apparatus according to claim 10, wherein the matching position determining means determines the matching position according to the steps of:

presetting, within the overlap area in the other image, the search range for each of the templates;

finding a matching degree at each position within the search range having been preset for each of the templates, while independently moving, within the search range, the template corresponding to the range;

selecting, for each of the templates, a position where the matching degree is high;

weighting selection of the position for each of the templates the reliability rank of which is high, from the positions selected for each of the templates; and determining as the matching position, a position frequently selected, and the rank setting means sets the reliability rank of each of the templates in accordance with a maximum of the matching degree or how the matching degree peaks found for each of the templates by the matching position determining means.

16. An image positioning processing apparatus as claimed in any one of claims 10–13 and 15, further comprising rotation correction means for rotating at least one of the two images prior to setting the templates so that a relative tilt between the two images is corrected based on the overlap area.

17. An image positioning processing apparatus as claimed in any one of claims 10–13 and 15, wherein the two images are two radiation images obtained by separately reading two stimulable phosphor sheets at least partially overlapping and storing an image of a subject.

18. An image positioning processing apparatus as claimed in any one of claims 10–13 and 15, further comprising overlap area detection means for detecting a boundary image in an overlap portion of a first radiation image obtained by reading a first stimulable phosphor sheet located farther from the subject upon photographing and overlapping with a second stimulable phosphor sheet located closer to the subject, and for detecting the overlap area based on the overlap area having been detected.

\* \* \* \* \*